US010665357B2

(12) United States Patent
Singh et al.

(10) Patent No.: US 10,665,357 B2
(45) Date of Patent: May 26, 2020

(54) NUCLEAR STEAM SUPPLY SYSTEM

(71) Applicant: SMR Inventec, LLC, Camden, NJ (US)

(72) Inventors: Krishna P. Singh, Hobe Sound, FL (US); Joseph Rajkumar, Marlton, NJ (US)

(73) Assignee: SMR INVENTEC, LLC, Camden, NJ (US)

( * ) Notice: Subject to any disclaimer, the term of this patent is extended or adjusted under 35 U.S.C. 154(b) by 97 days.

(21) Appl. No.: 15/859,934

(22) Filed: Jan. 2, 2018

(65) Prior Publication Data
US 2018/0144838 A1 May 24, 2018

Related U.S. Application Data

(63) Continuation of application No. 14/398,946, filed as application No. PCT/US2013/039743 on May 6, 2013, now Pat. No. 9,892,806.

(60) Provisional application No. 61/642,614, filed on May 4, 2012.

(51) Int. Cl.
G21D 1/00 (2006.01)
G21C 15/243 (2006.01)
G21C 13/073 (2006.01)

(52) U.S. Cl.
CPC .......... *G21D 1/006* (2013.01); *G21C 13/073* (2013.01); *G21C 15/243* (2013.01); *Y02E 30/40* (2013.01)

(58) Field of Classification Search
CPC ..... G21D 1/006; G21C 15/243; G21C 13/073
USPC ................................ 376/205, 294, 402, 461
See application file for complete search history.

(56) References Cited

U.S. PATENT DOCUMENTS

| 3,395,076 | A |   | 7/1968  | Ruppen |             |
|-----------|---|---|---------|--------|-------------|
| 3,718,353 | A | * | 2/1973  | Charcharos | G21C 13/073 |
|           |   |   |         |        | 376/461     |
| 3,966,549 | A |   | 6/1976  | Michel |             |
| 4,039,377 | A |   | 8/1977  | Andrieu et al. |       |
| 4,057,163 | A | * | 11/1977 | Widart | G21C 13/024 |
|           |   |   |         |        | 376/294     |

(Continued)

FOREIGN PATENT DOCUMENTS

WO    WO-2011097597 A1 *  8/2011   ............. G21C 15/26

OTHER PUBLICATIONS

Corresponding International Search Report for PCT/US2013/039743 dated Sep. 24, 2013.

*Primary Examiner* — Jack W Keith
*Assistant Examiner* — Daniel Wasil
(74) *Attorney, Agent, or Firm* — The Belles Group, P.C.

(57) ABSTRACT

A nuclear steam supply system includes an elongated reactor vessel having an internal cavity with a central axis, a reactor core having nuclear fuel disposed within the internal cavity, and a steam generating vessel having at least one heat exchanger section, the steam generating vessel being fluidicly coupled to the reactor vessel. The reactor vessel includes a shell having an upper flange portion and a head having a head flange portion. The upper flange portion is coupled to the head flange portion, wherein the upper flange portion extends into the internal cavity, and the head flange portion extends outward from the internal cavity. The flanges have a space saving design which are configured to minimize outward extension from the cavity while still providing desired leak protection at the interface between the shell and the head.

14 Claims, 7 Drawing Sheets

(56) References Cited

U.S. PATENT DOCUMENTS

| | | | |
|---|---|---|---|
| 4,082,608 A * | 4/1978 | Curet | G21C 15/18 |
| | | | 376/287 |
| 4,235,672 A | 11/1980 | Harand et al. | |
| 4,511,532 A | 4/1985 | Pierart | |
| 4,683,112 A | 7/1987 | Badoux et al. | |
| 4,746,485 A | 5/1988 | Commander | |
| 4,769,209 A | 9/1988 | Tower et al. | |
| 4,818,476 A | 4/1989 | Gasparro | |
| 5,207,977 A | 5/1993 | Desai | |
| 5,309,626 A | 5/1994 | Tolino | |
| 5,492,169 A | 2/1996 | Valadon | |
| 5,555,280 A | 9/1996 | Cartry | |
| 5,930,320 A * | 7/1999 | Challberg | G21C 13/02 |
| | | | 376/461 |
| 6,763,570 B2 | 7/2004 | Abbott et al. | |
| 7,389,669 B2 | 6/2008 | Badlani et al. | |
| 2006/0008045 A1 * | 1/2006 | Forsyth | G21C 15/12 |
| | | | 376/294 |
| 2010/0067644 A1 | 3/2010 | D'Auvergne | |

* cited by examiner

US 10,665,357 B2

NUCLEAR STEAM SUPPLY SYSTEM

CROSS REFERENCE TO RELATED APPLICATIONS

The present application is a continuation of U.S. patent application Ser. No. 14/398,946 filed Nov. 4, 2014, which is a national stage application under 35 U.S.C. § 371 to international application No. PCT/US2013/039743 filed May 6, 2013, which claims priority to U.S. Provisional Patent Application No. 61/642,614, filed May 4, 2012; the disclosures of which are incorporated herein by reference in their entireties.

FIELD OF THE INVENTION

The field of the present invention relates to nuclear steam supply systems, and more particularly to a steam supply system for small modular reactors.

BACKGROUND OF THE INVENTION

Pressurized water reactors (PWRs) for nuclear power generation facilities utilize both pumped and natural circulation of the primary coolant to both cool the reactor core and heat the secondary coolant to produce steam which may be working fluid for a Rankine power generation cycle. The existing natural circulation PWRs suffer from the drawback that the heat exchange equipment is integrated with and located within the reactor pressure vessel. Such an arrangement not only makes the heat exchange equipment difficult to repair and/or service, but also subjects the equipment to corrosive conditions and results in increased complexity and a potential increase in the number of penetrations into the reactor pressure vessel. In addition, locating the heat exchange equipment within the reactor pressure vessel creates problems with respect to radiation levels encountered for crews to repair the heat exchange equipment in proximity to the radioactively hot components of the reactor vessel. The general view has also been that the heat exchangers should be located in the reactor vessel to achieve natural circulation in those systems which may utilize this type of flow circulation.

The reduction of vulnerabilities within nuclear power generation facilities is always an ongoing issue. For example, large pipes are seen as creating the potential for a "large break" Loss of Coolant Accident (LOCA) event, and thus it is desirable to remove large pipes where possible.

SUMMARY OF THE INVENTION

A nuclear reactor vessel includes a shell and a head affixed to the upper end of the shell. The shell has an internal cavity with a central axis and an upper flange portion, wherein the internal cavity is configured to receive a reactor core. The head has a head flange portion, with the upper annular flange portion is coupled to the head annular flange portion, and the flanges are configured to minimize outward extension from the cavity while still providing desired leak protection at the interface between the shell and the head.

In a first separate aspect of the present invention, the upper flange portion of the shell is annular and extends into the internal cavity, and the head flange portion of the head is also annular and extends outward from the internal cavity.

In a second separate aspect of the present invention, a reactor core including nuclear fuel is disposed within the internal cavity of the nuclear reactor vessel, and a steam generating vessel including at least one heat exchanger section is fluidicly coupled to the reactor vessel. The upper flange portion of the shell extends into the internal cavity, and the head flange portion of the head extends outward from the internal cavity.

In a third separate aspect of the present invention, a reactor core including nuclear fuel is disposed within the internal cavity of the nuclear reactor vessel, and a steam generating vessel including at least one heat exchanger section is fluidicly coupled to the reactor vessel. The upper flange portion of the shell extends into the internal cavity, and the head flange portion of the head extends outward from the internal cavity. An inner surface of the first head portion is disposed closer to the central axis than an inner surface of the first shell portion along respective parallel radial lines extending from the central axis.

In a fourth separate aspect of the present invention, a method for generating steam utilizes the nuclear reactor vessel. The reactor vessel is capped with a head, and a reactor core is disposed within the reactor vessel. The upper flange portion extends into the internal cavity, and the head flange portion extends outward from the internal cavity. A liquid primary coolant is heated in the nuclear reactor core, and the heated primary coolant is discharged from a top portion of the reactor vessel into a steam generating vessel. The primary coolant is flowed through the reactor vessel and steam generating vessel in a closed circulation loop.

In a fifth separate aspect of the present invention, one or more of the preceding separate aspects may be employed in combination.

Advantages of the improvements will be apparent from the drawings and the description of the embodiments below.

BRIEF DESCRIPTION OF THE DRAWINGS

The foregoing summary, as well as the following detailed description of the exemplary embodiments, will be better understood when read in conjunction with the appended drawings. It should be understood, however, that the invention is not limited to the precise arrangements and instrumentalities shown in the following figures.

DETAILED DESCRIPTION OF THE INVENTION

Figure 1:
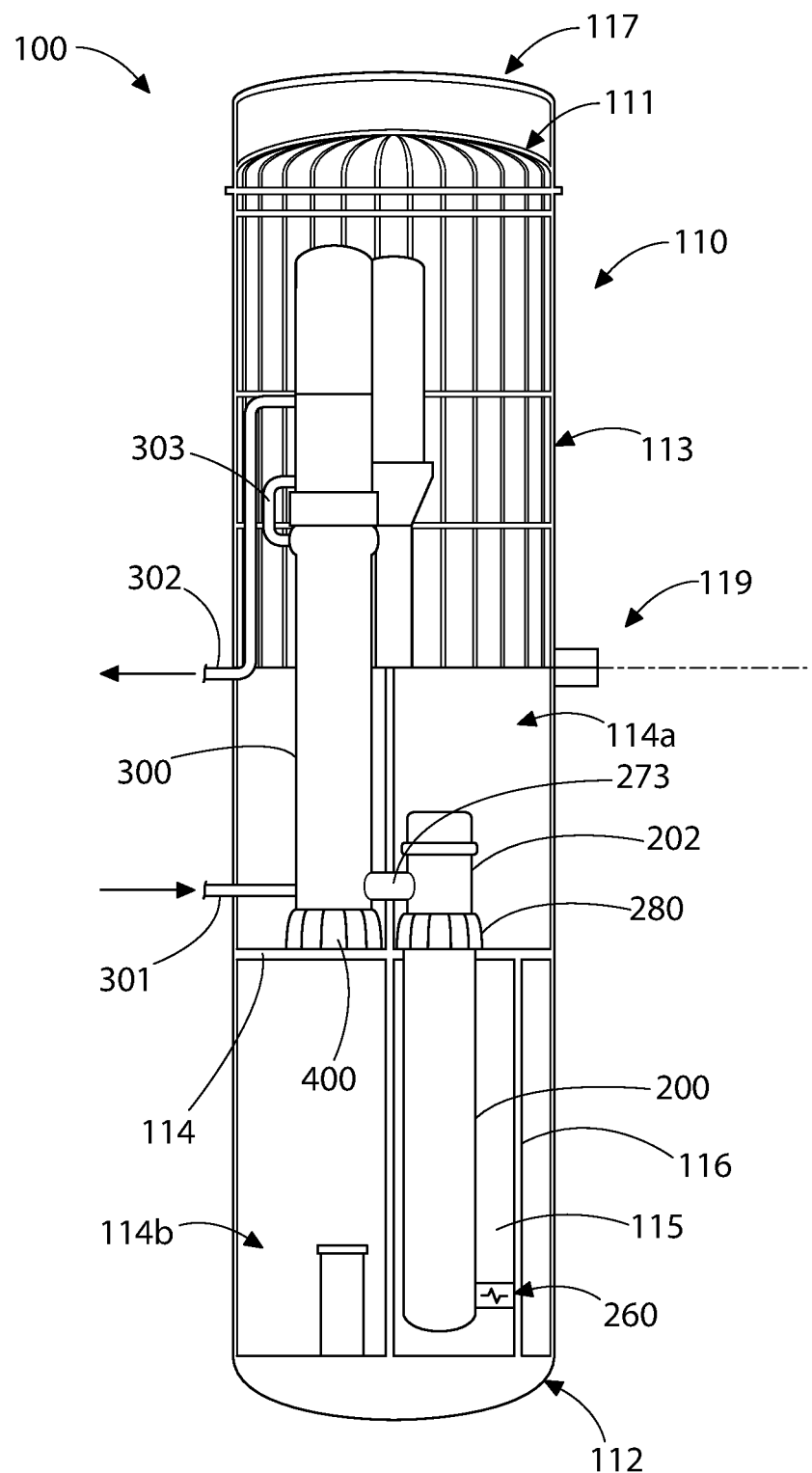
FIG. 1 is cross section of a containment vessel including a nuclear steam supply system.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "left," "right," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combinations of features that may exist alone or in other combinations of features; the scope of the invention being defined by the claims appended hereto.

Referring to FIGS. 1-6, a steam supply system for a nuclear pressurized water reactor (PWR) according to the present disclosure is shown. From the thermal-hydraulic standpoint, the system includes a steam generator assembly 100 generally including a reactor vessel 200 and a steam generating vessel 300 fluidly coupled to the reactor vessel. The steam generating vessel and reactor vessel are vertically elongated and separate components which hydraulically are closely coupled, but discrete vessels in themselves that are thermally isolated except for the exchange of primary loop coolant (i.e. reactor coolant) flowing between the vessels. As further described herein, the steam generating vessel 300 in one embodiment includes a preheater 320, main steam generator 330, and a superheater 350 which converts a fluid such as water flowing in a secondary coolant loop from a liquid entering the steam generating vessel 300 at an inlet 301 to superheated steam leaving the steam generating vessel at an outlet 302. The secondary coolant loop water may be a Rankine cycle fluid used to drive a turbine-generator set for producing electric power in some embodiments.

The steam generating vessel 300 further includes a pressurizer 380 which maintains a predetermined pressure of the primary coolant fluid. The pressurizer is a pressure vessel mounted atop the steam generating vessel 300 and engineered to maintain a liquid/gas interface (i.e. primary coolant water/inert gas) that operates to enable control of the primary coolant pressure in the steam generator. In one embodiment, as shown, the pressurizer 380 may be mounted directly on top of the steam generating vessel 300 and forms an integral unitary structural part of the vessel to hydraulically close the vessel at the top end. The assemblage of the foregoing three heat exchangers and the pressurizer may be referred to as a "stack."

Referring to FIG. 1, the reactor vessel 200 and the steam generating vessel 300 are housed in a steam generator containment vessel 110. The containment vessel 110 may be formed of a suitable shop-fabricated steel comprised of a top 111, a bottom 112, and a cylindrical sidewall 113 extending therebetween. In some embodiments, portions of the containment vessel which are located above ground level may be made of ductile ribbed steel to help withstand aircraft impact. A missile shield 117 which is spaced above the top 111 of the containment vessel 110 may be provided as part of the containment vessel or a separate containment enclosure structure (not shown) which encloses the containment vessel 110. A horizontal partition wall 114 divides the containment vessel into an upper portion 114a and a lower portion 114b. The partition wall 114 defines a floor in the containment vessel. In one embodiment, a majority of the reactor vessel 200 may be disposed in the lower portion 114b and the steam generating vessel 300 may be disposed in the upper portion 114a as shown.

In various embodiments, the containment vessel 110 may be mounted above ground, partially below ground, or completely below ground. In certain embodiments, the containment vessel 110 may be positioned so that at least part or all of the lower portion 114b that contains the nuclear fuel reactor core (e.g., a fuel cartridge 230) is located below ground level. In one embodiment, the entire reactor vessel 200 and a portion of the steam generating vessel 300 are located entirely below ground level for maximum security. The cylindrical shell or sidewall 113 of the containment vessel 110 may be horizontally split into an upper section and a lower section, which are joined together by a circumferential welded or bolted flanged joint 119 as shown in FIG. 1 to provide a demarcation for portions of the containment vessel which are located above and below ground level. In other embodiments, the upper and lower sections may be welded together without use of a flange.

In one embodiment, for example without limitation, the containment vessel 110 may have a representative height of approximately 200 feet or more for a 160 MW (megawatt) modular nuclear electric generation facility. A non-limiting representative diameter for this power generation facility is about 45 feet. Any suitable height and diameter for the containment vessel may be provided depending on system component configuration and dimensions.

The containment vessel 110 further includes a wet reactor well 115 defined in one embodiment by a cylindrical circumscribing walled enclosure 116 which is flooded with water to provide enhanced radiation shielding and a back-up reserve of readily accessible coolant for the reactor core. In one embodiment, the walled enclosure 116 may be formed of stainless steel cylindrical walls which extend circumferentially around the reactor vessel 200 as shown. Other suitable materials may be used to construct the enclosure 116. The wet reactor well 115 is disposed in the lower portion 114b of the containment vessel 110. The lower portion 114b may further include a flooded (i.e. water) used fuel pool 118 adjacent to the enclosure 116. In one embodiment, as shown in FIG. 1, both the used fuel pool 118 and the walled enclosure 116 are disposed below the horizontal partition wall 114 as shown in FIG. 1.

In one embodiment, as shown in FIG. 1, the walled enclosure 116 may extend above the partition wall 114 and the inlet/outlet nozzle connection between the reactor and steam generating vessels may be made by a penetration through the walled enclosure.

As further shown in FIG. 1, both the reactor vessel 200 and the steam generating vessel 300 preferably may be vertically oriented as shown to reduce the footprint and diameter of the containment vessel 110. The containment vessel 110 has a diameter large enough to house both the reactor vessel, steam generating vessel, and any other appurtenances. The containment vessel 110 preferably has a height large enough to completely house the reactor vessel and steam generating vessel to provide a fully contained steam generator with exception of the water and steam inlet and outlet penetrations for second coolant loop fluid flow associated with the Rankine cycle for driving the turbine-generator set for producing electric power.

Figure 2:
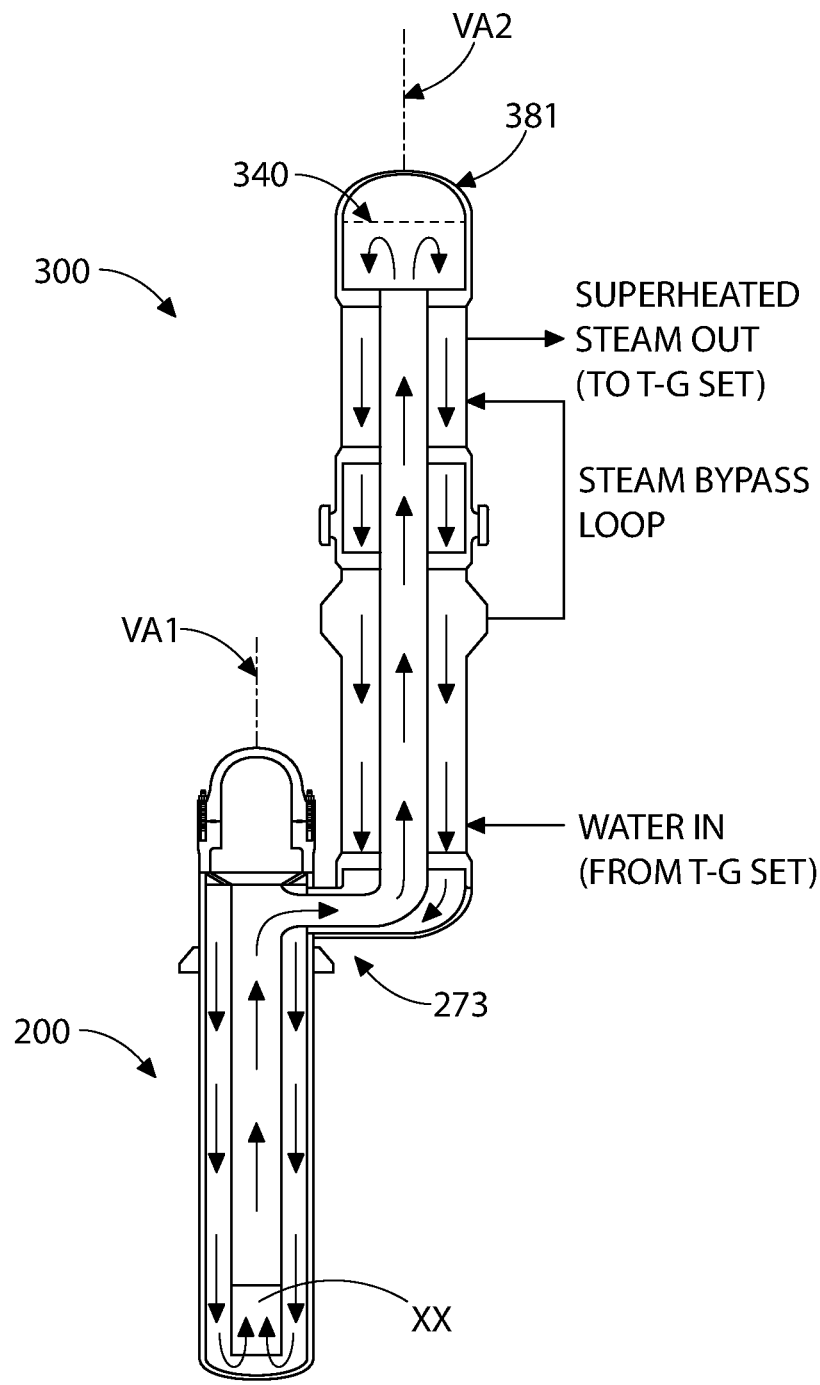
FIG. 2 is a schematic flow diagram of the nuclear steam supply system of FIG. 1 showing the flow path or circulation flow loop of primary coolant represented by the flow arrows.

FIG. 2 shows the flow or circulation of primary coolant (e.g. water) in the primary coolant loop. In one embodiment, the primary coolant flow is gravity-driven relying on the change in temperature and corresponding density of the coolant as it is heated in the reactor vessel 200, and then cooled in the steam generating vessel 300 as heat is transferred to the secondary coolant loop of the Rankine cycle which drives the turbine-generator (T-G) set. The pressure head created by the changing different densities of the coolant (i.e. hot—lower density and cold—higher density) induces flow or circulation through the reactor vessel-steam generating vessel system as shown by the directional flow arrows. Advantage, the gravity-driven primary coolant circulation requires no coolant pumps or machinery thereby resulting in cost (capital, operating, and maintenance) savings, reduced system power consumption thereby increasing energy conversion efficiency of the PWR system, in addition to other advantages as described herein.

The reactor vessel 200 may be similar to the reactor vessel with gravity-driven circulation system disclosed in commonly-owned U.S. patent application Ser. No. 13/577,163 filed Aug. 3, 2012, the disclosure of which is incorporated herein by reference in its entirety.

Figure 3A:
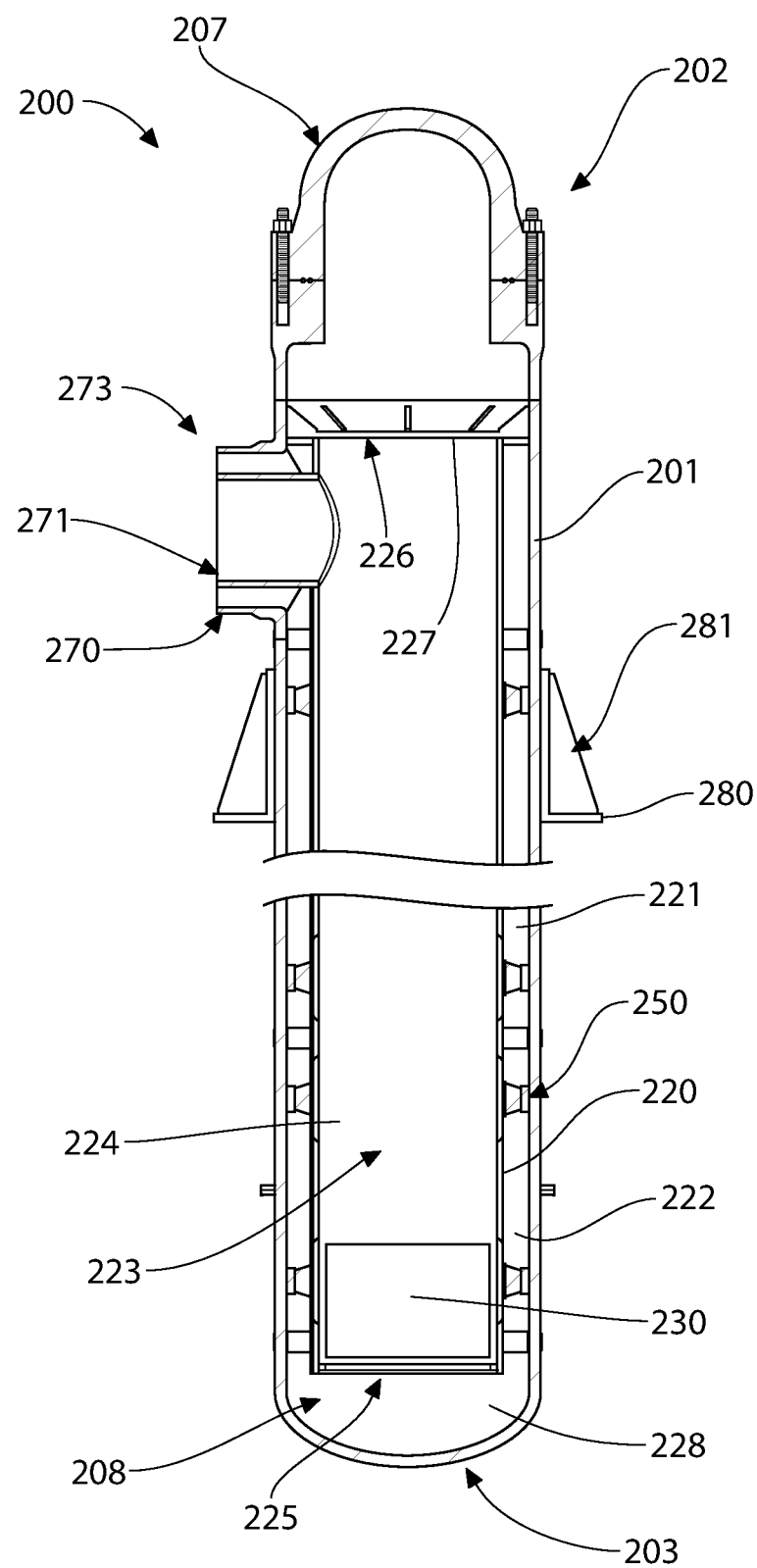
FIG. 3A is an elevation cross-sectional view of the reactor vessel of FIG. 1.
Figure 3B:
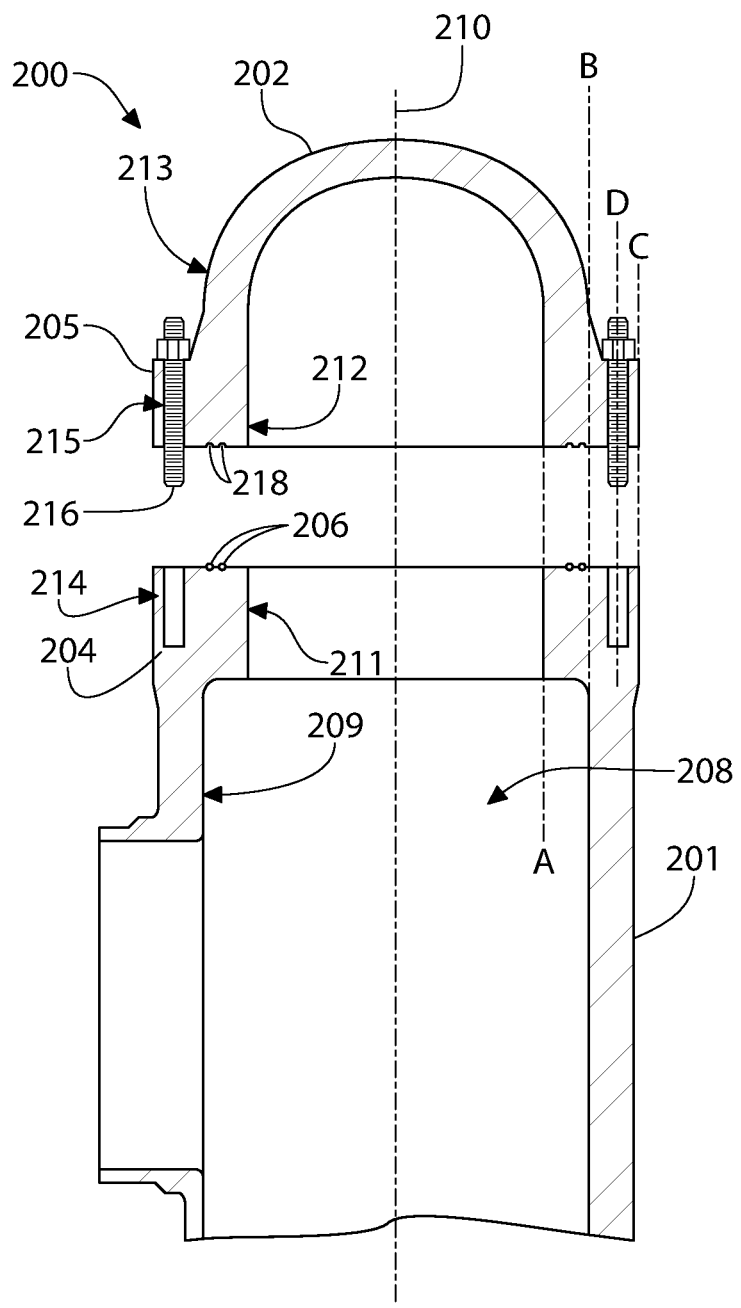
FIG. 3B is a detailed cross-sectional view of the reactor vessel of FIG. 3A.

Referring to FIGS. 3A and 3B, the reactor vessel 200 in one embodiment is an ASME code Section III, Class 1 thick-walled cylindrical pressure vessel includes a cylindrical sidewall shell 201, an integrally welded hemispherical bottom head 203 and, a removable hemispherical top head 202. The shell 201 primarily defines an internal cavity 208 configured for holding the reactor core, reactor shroud, and other appurtenances as described herein. In one embodiment, the upper extremity of the reactor vessel shell 201 is equipped with a tapered hub flange 204 (also known as "welding neck" flange in the art) which is bolted to a similar flange 205 welded to the top head 202. Commonly-owned PCT patent application No. PCT/US2013/0038289, filed Apr. 25, 2013, the disclosure of which is incorporated herein by reference in its entirety, discloses known prior-art for the design and coupling of the top head to the shell using two flanges.

Each flange 204, 205 may be annular, so that each extends completely around the shell 201 and the head 202, respectively. Each flange may also be integrally formed as part of the shell 201 and the top head 202. The flange 204 extends into and toward the central axis 209 of the cavity 208, with the flange 204 forming at about the point where the sidewalls of the shell 201 begin to widen. In the case that the flange 204 is annular, it extends radially into the cavity around the entire cavity, and similarly, in the case that the flange 205 is annular, it extends radially outward from the cavity all around. As can be seen in the embodiment depicted, the inner sidewall surfaces 209 of the shell 201, excluding the flange 204, are defined by a first inner radius, measured from the central axis 210 of the cavity 208, and the inner sidewall surfaces 211 of the flange 204 are defined by a second inner radius, with the second inner radius being smaller than the first inner radius. The outward-extending head flange 205, which is formed at about the point where the sidewalls of the top head 202 begin to widen, has an inner surface 212 that may be at about the same distance from the central axis 210 as the inner sidewall surfaces 211 of the shell flange 204, as can be seen by line A. Thus, the inner surfaces 211, 212 of the two flanges 204, 205 have about the same radius from the central axis 210, and the inner surfaces 212 of the flange 205 have a smaller radius than the inner sidewall surfaces 209 of the shell 201. Also, the outer surfaces 213 of the hemispherical wall of the top head 202, at a point just above the flange 205, may be at about the same distance from, or even closer to, the central axis 210 as the inner sidewall surfaces 211 of the shell flange 204, as can be seen by line B. This results in the radius of the outer surfaces 213 having about the same radius from the central axis 210 as the inner sidewall surfaces 211, although the outer surfaces 213 could also have a radius less than that of the inner sidewall surfaces 211. So that the coupled flanges 204, 205 may each still serve as a "welding neck" flange, the outer surfaces 214, 215 of each flange may be at about the same distance from the central axis 210, as can be seen by line C. All distance and measurement comparisons between the shell 201 and the top head 210 are being made along parallel radial lines having the central axis 210 as a center.

The top head 202 may be fastened to the shell 201 by coupling the flanges 204, 205 via a set of alloy bolts 216, which are pre-tensioned to establish a high integrity double gasket seal under all operation modes. The bolted connection of the top head 202 provides ready access to the reactor vessel internals such as the reactor core. The centerline, line D, of the bolts 216 may be at a distance greater than the internal surfaces 209 of the shell 201, but at a lesser distance than the outer surfaces 214 of the shell flange 204. In one embodiment as shown in FIG. 3B, the outer surface 214 of the shell flange 204 is substantially flush with the vertical outer surface of the cylindrical shell 201 of the reactor vessel 200 immediately below the upper flange portion such that there is no appreciable projection of the flange beyond the shell.

Two concentric self-energizing gaskets 206 are placed in a pair of annular grooves 218, the grooves being formed in both flanges 204, 205, between the bolts 216 and the inner surfaces 211, 212, and compressed between the interfacing surfaces of two flanges 204, 205, when coupled together, to provide leak tightness of the reactor vessel 200 at the connection between the top head 202 and the shell 201. The leak tightness under operating conditions is assured by an axisymmetric heating of the flanged joint that is provided by the fluid flow arrangement of the primary coolant in the system, as further described herein. The top head 202 contains the vertical penetrations 207 for insertion of the control rods and further may serve as a base for mounting the associated control rod drives, both of which are not depicted but well known in the art without further elaboration.

With continuing reference to FIG. 3A, the reactor vessel 200 includes a cylindrical reactor shroud 220 which contains the reactor core defined by a fuel cartridge 230. The reactor shroud 220 transversely divides the shell portion of the reactor vessel into two concentrically arranged spaces: (1) an outer annulus 221 defining an annular downcomer 222 for primary coolant entering the reactor vessel which is formed between the outer surface of the reactor shroud and the inner surface of the shell 201; and (2) a passageway 223 defining a riser column 224 for the primary coolant leaving the reactor vessel heated by fission in the reactor core. The reactor shroud 220 is elongated and extends in an axial direction along vertical axis VA1 of the reactor vessel which defines a height and includes an open bottom 225 and a closed top 226. In one embodiment, the top 226 may be closed by a top flow isolation plate 227 which directs primary coolant flowing up the riser column 224 to the steam generating vessel 300, as further described herein. In one embodiment, the bottom 225 of the reactor shroud 220 is vertically spaced apart by a distance from the bottom head 203 of the reactor vessel 200 and defines a bottom flow plenum 228. The bottom flow plenum 228 collects primary coolant from the annular downcomer 222 and directs the coolant flow into the inlet of the riser column 224 formed by the open bottom 225 of the reactor shroud 220 (see, e.g. FIG. 2).

Both the fuel cartridge 230 and the reactor shroud 220 are supported by a core support structure ("CSS"), which in one embodiment includes a plurality of lateral support members 250 that span between and are attached to the reactor shroud and the shell 201 of the reactor vessel 200. A suitable number of supports members space both circumferentially and vertically apart are provided as needed to support the combined weight of the fuel cartridge 230 and the reactor shroud 220. In one embodiment, the bottom of the reactor shroud 220 is not attached to the reactor vessel 200 to allow the shroud to grow thermally in a vertical axial direction (i.e. parallel to vertical axis VA1) without undue constraint.

The reactor shroud 220 is a double-walled cylinder in one embodiment which may be made of a corrosion resistant material, such as without limitation stainless steel. This double-wall construction of the reactor shroud 220 forms an insulated structure designed to retard the flow of heat across it and forms a smooth vertical riser column 224 for upward flow of the primary coolant (i.e. water) heated by the fission in the fuel cartridge 230 ("core"), which is preferably located at the bottom extremity of the shroud in one embodiment as shown in FIGS. 1-3. The vertical space above the fuel cartridge 230 in the reactor shroud 220 may also contain interconnected control rod segments along with a set of "non-segmental baffles" that serve to protect them from flow induced vibration during reactor operations. The reactor shroud 220 is laterally supported by the reactor vessel by support members 250 to prevent damage from mechanical vibrations that may induce failure from metal fatigue.

The fuel cartridge 230 in one embodiment is a unitary autonomous structure containing upright fuel assemblies, and is situated in a region of the reactor vessel 200 that is spaced above the bottom head 203 so that a relatively deep plenum of water lies underneath the fuel cartridge. The fuel cartridge 230 is insulated by the reactor shroud 220 so that a majority of the heat generated by the fission reaction in the nuclear fuel core is used in heating the primary coolant flowing through the fuel cartridge and adjoining upper portions of the riser column 224. The fuel cartridge 230 is an open cylindrical structure including cylindrically shaped sidewalls 231, an open top 233, and an open bottom 234 to allow the primary coolant to flow upward completely through the cartridge (see directional flow arrows). In one embodiment, the sidewalls 231 may be formed by multiple arcuate segments of reflectors which are joined together by suitable means. The open interior of the fuel cartridge 230 is filled with a support grid 232 for holding the nuclear fuel rods and for insertion of control rods into the core to control the fission reaction as needed.

Briefly, in operation, the hot reactor primary coolant exits the reactor vessel 200 through a low flow resistance outlet nozzle 270 to be cooled in the adjacent steam generating vessel 300, as shown in FIGS. 2 and 3. The cooled reactor primary coolant leaves the steam generating vessel 300 and enters the reactor vessel 200 through the inlet nozzle 271. The internal plumbing and arrangement in the reactor vessel directs the cooled reactor coolant down through to the annular downcomer 222. The height of the reactor vessel 200 is preferably selected to support an adequate level of turbulence in the recirculating reactor primary coolant by virtue of the density differences in the hot and cold water columns which is commonly known as the thermo-siphon action (density difference driven flow) actuated by gravity. In one embodiment, the circulation of the reactor primary coolant is driven by over 8 psi pressure generated by the thermo-siphon action, which has been determined to ensure (with adequate margin) a thoroughly turbulent flow and stable hydraulic performance.

Referring to FIGS. 1 and 3, the top of the reactor vessel shell 201 is welded to a massive upper support forging which may be referred to as a reactor support flange 280. The support flange 280 supports the weight of the reactor vessel 200 and internal components above the wet reactor well 115. In one embodiment, the support flange is structurally stiffened and reinforced by a plurality of lugs 281 which are spaced circumferentially apart around the reactor vessel and welded to both the reactor vessel and flange, as shown. Support flange contacts and engages the horizontal partition wall 114, which transfers the dead weight of the reactor vessel 200 to the containment vessel 110. The reactor vessel's radial and axial thermal expansion (i.e. a majority of growth being primarily downwards from the horizontal partition wall 114) as the reactor heats up during operation is unconstrained. However, the portion of the containment vessel 110 which projects above the partition wall 114 is free to grow upwards in unison with the upwards growth of the steam generating vessel 30 to minimize axial differential expansion between the steam generating vessel and reactor vessel. Because the reactor vessel and steam generating vessel are configured and structured to thermally grow in height at substantially the same rate when heated, this arrangement helps minimize potential thermal expansions stress in the primary coolant fluid coupling 273 between the reactor vessel and steam generating vessel.

The support flange 280 is spaced vertically downwards on the reactor vessel shell 201 by a distance from the top head 202 of the reactor vessel 200 sufficient to allow a fluid connection to be made to the steam generating vessel 300 which is above the partition wall 114, as shown in FIGS. 1 and 2. When the reactor vessel 200 is mounted inside the containment vessel 110, the top head 202 of the reactor vessel and the primary coolant fluid coupling 273 (collectively formed by combined the inlet-outlet flow nozzle 270/271 and the inlet-outlet flow nozzle 371/370 of the steam generating vessel 300, shown in FIG. 4) are located above the reactor well 115. This provides a location for connection to the steam generator headers and for the engineered safety systems (e.g. control rods, etc.) to deal with various postulated accident scenarios. A majority of the reactor vessel shell 201, however, may be disposed below the partition wall 114 and immersed in the wet reactor well 115 as shown in FIG. 1.

The bottom region of the reactor vessel 200 is restrained by a lateral seismic restraint system 260 (shown schematically in FIG. 1) that spans the space between the reactor shell 201 and the reactor well 115 inside surface of the cylindrical enclosure 116 to withstand seismic events. The seismic restraint design is configured to allow for free axial (i.e. longitudinal along vertical axis VA1) and diametrical thermal expansion of the reactor vessel 200. The reactor well 115 is flooded during power operations to provide defense-in-depth against a (hypothetical, non-mechanistic) accident that is assumed to produce a rapid rise in the enthalpy of the reactor's contents. Because the reactor is designed to prevent loss of core water by leaks or breaks and the reactor well is flooded, burn-through of the reactor vessel by molten fuel (corium) is not likely.

Figure 4:
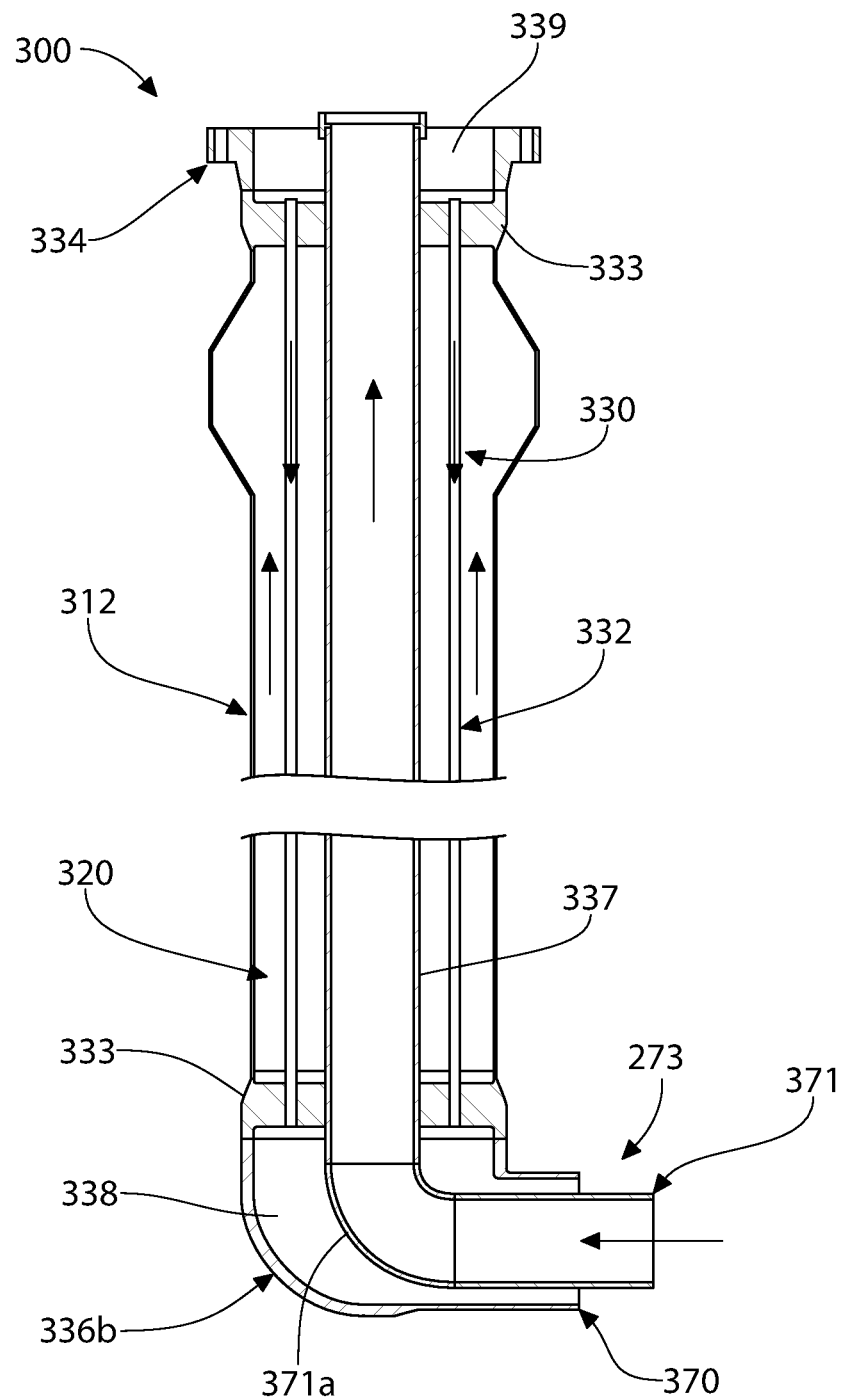
FIG. 4 is an elevation cross-sectional view of the bottom portion of the steam generating vessel reactor vessel of FIG. 1 showing the preheater section and steam generator section.
Figure 5:
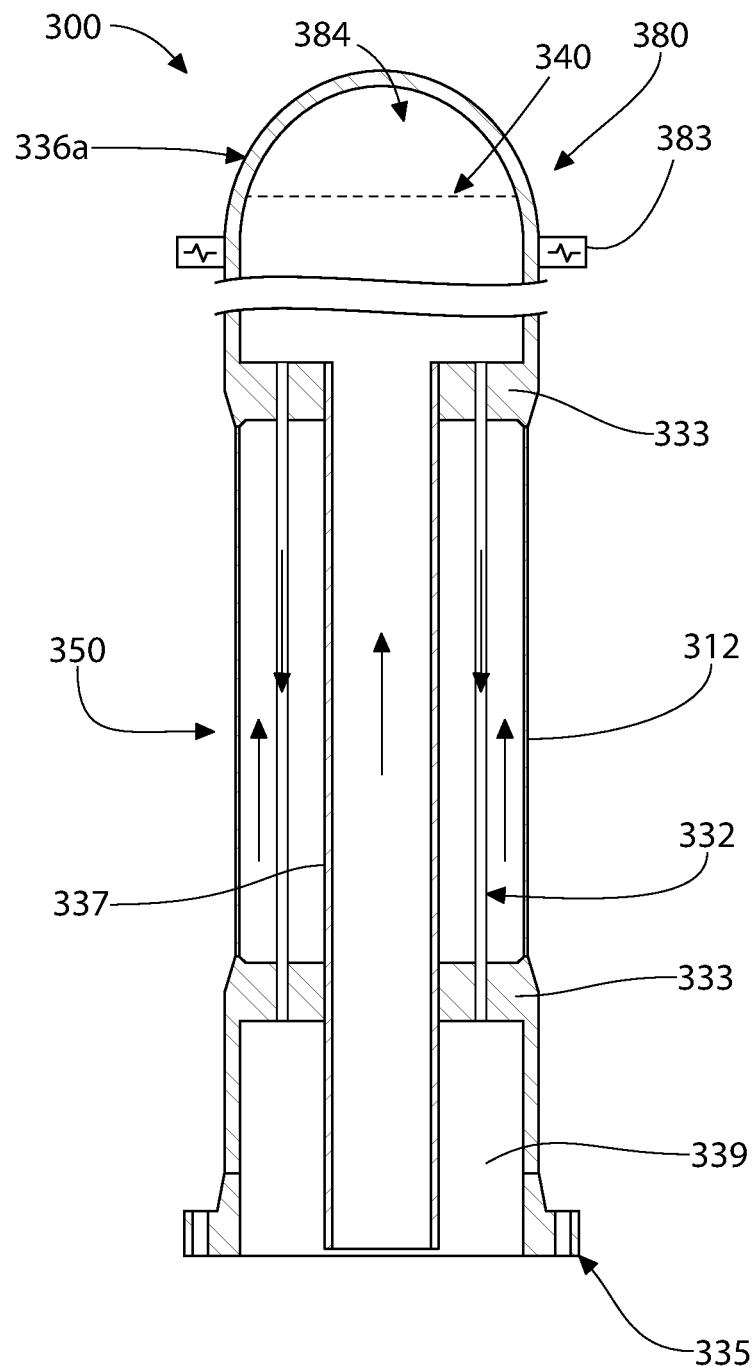
FIG. 5 is an elevation cross-sectional view of the top portion of the steam generating vessel of FIG. 1 showing the superheater section and pressurizer mounted atop the steam generating vessel.
Figure 6:
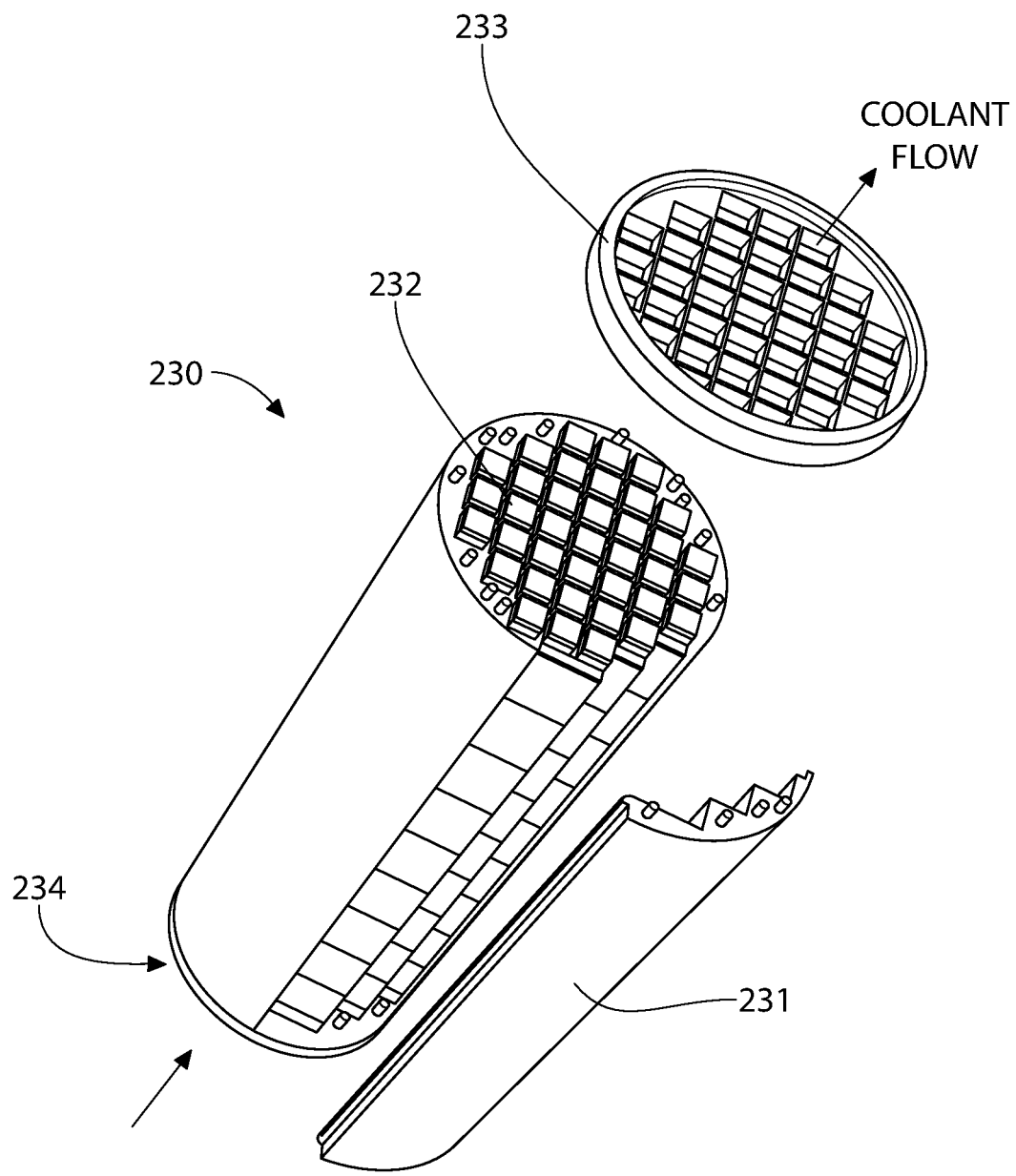
FIG. 6 is an exploded perspective view of the fuel cartridge positioned in the reactor vessel of FIG. 1.

Referring to FIGS. 3 and 4, the combined inlet-outlet flow nozzle 270/271 has two concentric hollow forgings including an outer inlet nozzle 270 and an inner outlet nozzle 271. The outlet nozzle 271 has one end welded to the reactor shroud 220 (internal to the reactor vessel shell 201) and an opposite end welded to the inlet nozzle 371 of the steam generating vessel 300. The inlet nozzle 270 has one end welded to the reactor vessel shell 201 and an opposite end welded to the outlet nozzle 370 of the steam generating vessel 300. The flow isolation plate 227 helps ensure that the hot primary coolant water exiting the reactor vessel cannot flow back into the annulus 221. In the present embodiment, the outlet nozzle 271 of the reactor vessel and the inlet nozzle 371 of the steam generating vessel each have a smaller diameter than the inlet nozzle 270 of the reactor vessel and the outlet nozzle 270 of the steam generating vessel. The combined inlet-outlet flow nozzle 270/271 is located above the partition wall 114 of the containment vessel 110. The inlet nozzle 371 and the outlet nozzle 370 of the steam generating vessel 300 collectively define a mating concentrically arranged combined inlet/outlet nozzle 371/370 for the steam generating vessel.

In order to avoid long loops of large piping in the reactor primary coolant system which creates the potential for a "large break" LOCA event, both the combined inlet-outlet flow nozzle 270/271 of the reactor vessel 200 and the combined inlet/outlet nozzle 371/370 for the steam generating vessel are intentionally very closely coupled to the shells of their respective vessels having a minimal radial projection beyond the shells. The design of the top of the reactor vessel, with the flanged connection between the head and the shell of the reactor vessel, helps to minimize this radial projection beyond the shell. This is accomplished by reducing the extent to which the flanges extend out from the shell, as compared to the prior art. In addition, cost advantages may be realized in having the inlet-outlet flow nozzle 270/271 shortened, in that different manufacturing techniques may be used to create the shorter inlet-outlet flow nozzle 270/271 as compared to if a longer flow nozzle is required.

This permits the reactor vessel 200 to be directly coupled to the steam generating vessel 300 via the inlet/outlet nozzles as shown in FIGS. 1 and 2. As shown in FIG. 3A, the combined inlet-outlet flow nozzle 270/271 of the reactor vessel preferably protrudes radially beyond the shell 201 by a distance that is no more than the radial projection of the support flange 280. The total length of the inlet/outlet nozzle connection between the reactor vessel 200 and steam generating vessel 300 in certain embodiment is less than or equal to the diameter of the reactor vessel 200, and/or the steam generating vessel 300 to eliminate long runs of large coolant piping between the reactor and steam generating vessels. In one embodiment, the nozzle connections between the reactor vessel 200 and the steam generating vessel 300 is straight without any elbows or bends.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. A nuclear steam supply system comprising:
   a vertically elongated reactor vessel comprising an internal cavity with a central axis and a primary coolant flow nozzle extending outwards from the reactor vessel;
   a reactor core comprising nuclear fuel disposed within the internal cavity;
   a steam generating vessel comprising at least one heat exchanger section, the steam generating vessel being fluidly coupled to the reactor vessel;
   wherein the reactor vessel comprises a cylindrical shell having an annular upper flange portion, and a head having an annular head flange portion, the upper flange portion being removably coupled to the head flange portion, and wherein the upper flange portion extends inwards into the internal cavity, and the head flange portion extends outward from the internal cavity; and
   wherein an outer surface of the upper flange portion of the shell is substantially flush with a vertical outer surface of the cylindrical shell of the reactor vessel below the upper flange portion.

2. The system according to claim 1 wherein the shell includes a first shell portion below the upper flange portion having a first inner radius, and the head includes a first head portion having a second inner radius, which is smaller than the first inner radius.

3. The system according to claim 2, wherein the upper flange portion of the shell that extends into the central cavity defines a third inner radius which is about the same as the second inner radius of the first head portion and smaller than the first inner radius of the first shell portion.

4. The system according to claim 1, wherein the shell includes a first shell portion below the upper flange portion having an inner radius, and the head includes a first head portion above the head flange portion having an outer radius, which is smaller than or equal to the inner radius.

5. The system according to claim 1 wherein the shell includes a first shell portion below the upper flange portion having a first inner surface, and the head includes a first head portion above the head flange portion having a second inner surface, and wherein the second inner surface is closer to the central axis than the first inner surface along respective parallel radial lines extending from the central axis.

6. The system according to claim 1 wherein the shell includes a first shell portion below the upper flange portion of the shell, the first shell portion having a first inner surface and the upper flange portion of the shell having a second inner surface, and wherein the second inner surface is closer to the central axis than the first inner surface along respective parallel radial lines extending from the central axis.

7. The system according to claim 6, wherein the primary coolant flow nozzle is disposed on the first shell portion.

8. The system according to claim 7, wherein the primary coolant flow nozzle is formed as an integral forging with the shell of the reactor vessel.

9. The system according to claim 7, further comprising an annular support flange attached to the first shell portion of the reactor vessel, the support flange configured for mounting on a horizontal surface to support a weight of the reactor vessel.

10. The system according to claim 1 wherein the shell includes a first shell portion having an inner surface, and the head includes a first head portion above the head flange portion having an outer surface, and wherein the outer surface is at least as close to the central axis as the inner surface along respective parallel radial lines extending from the central axis.

11. The system according to claim 1 wherein the shell includes a first shell portion having a first outer surface, the head includes a first head portion having a second outer surface, and a plurality of fasteners secure the upper flange portion to the head flange portion, and wherein the fasteners are each disposed further from the central axis than the second outer surface and nearer the central axis than the first outer surface.

12. The system according to claim 11, further comprising a plurality of circumferentially arranged longitudinal bores formed in both the upper flange portion of the shell and the head flange portion of the head that receive the fasteners, wherein a first distance between each bore and the central axis of the internal cavity of the reactor vessel is less than a second distance between the central axis and an outer surface of the first shell portion of the reactor vessel.

13. The system according to claim 12, wherein the longitudinal bores in the upper flange portion of the shell extend partially into the upper flange portion and the longitudinal bores in the head flange portion of the head extend completely through the head flange portion.

14. The system according to claim 12, wherein the fasteners are threaded fasteners.

* * * * *